(12) United States Patent
Mohammad (10) Patent No.: US 6,950,960 B2
(45) Date of Patent: Sep. 27, 2005

(54) DISABLING A CLOCK SIGNAL TO A PERIPHERAL INTERFACE ENGINE BLOCK DURING PERIPHERAL OPERATION IN A SELECTED OPERATIONAL MODE

(75) Inventor: Saleem Chisty Mohammad, Milpitas, CA (US)

(73) Assignee: Synopsys, Inc., Mountain View, CA (US)

( * ) Notice: Subject to any disclaimer, the term of this patent is extended or adjusted under 35 U.S.C. 154(b) by 674 days.

(21) Appl. No.: 09/907,132

(22) Filed: Jul. 17, 2001

(65) Prior Publication Data

US 2003/0018925 A1 Jan. 23, 2003

(51) Int. Cl.[7] .............................................. G06F 1/04
(52) U.S. Cl. ........................ 713/600; 713/322; 710/10
(58) Field of Search ................. 713/320–324, 713/500–601; 710/10, 11, 60

(56) References Cited

U.S. PATENT DOCUMENTS

| | | | | |
|---|---|---|---|---|
| 5,263,172 A | * | 11/1993 | Olnowich | 710/307 |
| 5,838,995 A | * | 11/1998 | Chen et al. | 710/60 |
| 6,073,186 A | * | 6/2000 | Murray et al. | 710/11 |
| 6,085,325 A | * | 7/2000 | Jackson et al. | 713/300 |
| 6,272,644 B1 | * | 8/2001 | Urade et al. | 713/320 |
| 6,321,342 B1 | * | 11/2001 | Day et al. | 713/600 |
| 6,439,464 B1 | * | 8/2002 | Fruhauf et al. | 235/492 |
| 6,467,042 B1 | * | 10/2002 | Wright et al. | 713/320 |
| 6,496,938 B1 | * | 12/2002 | Fry et al. | 713/322 |
| 6,529,988 B1 | * | 3/2003 | Yoshikawa et al. | 710/305 |
| 6,593,768 B1 | * | 7/2003 | Iyer et al. | 326/30 |
| 6,611,552 B2 | * | 8/2003 | Beck | 375/219 |
| 6,674,821 B1 | * | 1/2004 | Mejyr | 375/354 |
| 6,675,305 B1 | * | 1/2004 | Mohammad | 713/322 |
| 6,721,892 B1 | * | 4/2004 | Osborn et al. | 713/300 |
| 6,839,778 B1 | * | 1/2005 | Sartore et al. | 710/60 |
| 2001/0017846 A1 | * | 8/2001 | Wu | 370/257 |
| 2002/0124200 A1 | * | 9/2002 | Govindaraman | 713/400 |

OTHER PUBLICATIONS

USB Tranceiver Macrocell Interface (UTMI) Specification, Version 1.05, Mar. 29, 2001, copyright 199–2001, Intel Corporation.*

Design Consideration USB2 PHY Core, Patrick Yu, inSilicon Corporation, Oct. 11, 2000.*

USB 2.0 Technical Overview, Brad Hosler, USB Engineering Manager, Intel Corporation, May 8, 2001.*

USB 2.0 Tranceiver Macrocell, Steve McGowan (Intel Corporation) and Clarence Lewis (Texas Instruments), May 17, 1999.*

Analog IP Inc., USB 2.0 UTMI Macrocell Core, Aug. 2000.*

* cited by examiner

*Primary Examiner*—Fritz M. Fleming
(74) *Attorney, Agent, or Firm*—Bever, Hoffman & Harms, LLP; John M. Kubodera (57) ABSTRACT

A method and system that selects an operational mode for a peripheral that has an interface engine block. When the peripheral operates in the operational mode a clock signal to the interface engine block is disabled for at least a portion of time.

12 Claims, 6 Drawing Sheets

DISABLING A CLOCK SIGNAL TO A PERIPHERAL INTERFACE ENGINE BLOCK DURING PERIPHERAL OPERATION IN A SELECTED OPERATIONAL MODE

TECHNICAL FIELD

The invention relates generally to peripheral devices, and more particularly to (Universal Serial Bus) peripheral devices.

BACKGROUND OF THE INVENTION

Peripheral devices that are compatible with the USB 2.0 standard typically have a serial interface engine block (SIE) and a parallel interface engine block (PIE). USB 2.0 peripheral devices employ SIEs and PIEs to transmit and receive data from host devices.

USB 2.0 peripherals, however, do not utilize the SIEs and PIEs at the same time. Instead, the SIEs are employed solely for peripheral operation in either the 1.5 Mbps low speed (LS) it operational mode or the 12 Mbps full-speed (FS) operational mode. Similarly, the PIEs are employed solely for peripheral operation in the 480 Mbps high speed (HS) operational mode. Therefore, during operation of a USB 2.0 peripheral, one interface engine block is active while the other interface engine block is inactive.

Despite the inactivity of one interface engine block, however, conventional USB 2.0 peripheral designs provide clock signals to both the SIE and the PIE regardless of the operational mode of the peripheral. Providing a clock signal to an inactive interface engine block results in USB 2.0 peripherals consuming more power than is necessary. Therefore, a need exists for a USB 2.0 peripheral that reduces power consumption by only providing a clock signal to the active interface engine block.

SUMMARY OF THE INVENTION

Shortcomings of the existing art are overcome through the provision of disabling a clock signal to a peripheral interface engine block during peripheral operation in a selected operational mode.

The invention in one example encompasses a method. An operational mode is selected for a peripheral that has an interface engine block. A clock signal to the interface engine block is disabled, for at least a portion of time, when the peripheral operates in the operational mode.

Another example of the invention encompasses a system. The system comprises a speed enumeration block that selects an operational mode for a peripheral that has an interface engine 1 block. Clock gating logic disables a clock signal to the interface engine block, for at least a portion of time, when the peripheral operates in the operational mode.

Another example of the invention encompasses a device that controls clock signals to a first interface engine block and a second interface engine block in a peripheral. The device comprises clock gating logic. The clock gating logic disables a clock signal to the first interface engine block, for at least a portion of time, when the peripheral operates in a first operational mode. The clock gating logic disables a clock signal to the second interface engine block, for at least a portion of time, when the peripheral operates in a second operational mode.

These and other features will become apparent from the following detailed description, the accompanying drawings, and the claims.

DETAILED DESCRIPTION

Figure 1:
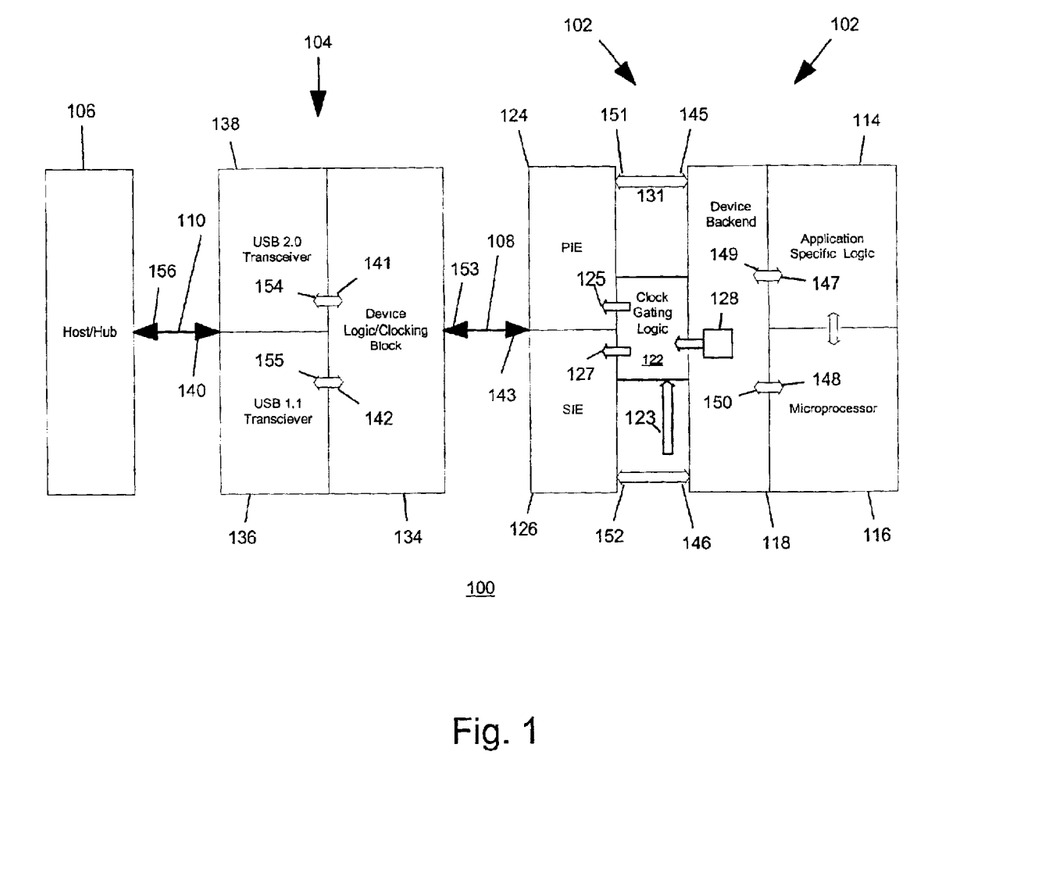
FIG. 1 is an exemplary functional block diagram of a system comprising a peripheral device having at least one interface engine block connected to a host device.

Turning to FIG. 1, system 100, in one example, includes a plurality of components such as computer software and/or hardware components. A number of such components can be combined or divided in one example of system 100. An exemplary component of system 100 employs and/or comprises a series of computer instructions written in or implemented with any of a number of programming languages, as will be appreciated by those skilled in the art.

System 100 in one example comprises a peripheral device 102, a macrocell 104, and a host/hub device 106. Peripheral device 102 is connected to macrocell 104 through interface 108. Macrocell 104 is connected to a host/hub device 106 through bus 110.

Peripheral device 102 comprises a device that provides a peripheral function to host/hub device 106. Examples of such devices include, but are not limited to, printers, scanners, digital cameras, and the like. Peripheral device 102 in one example comprises a peripheral device that is compatible with the USB 2.0 standard. Exemplary components of peripheral device 102 include application specific logic 114, microprocessor 116, device backend 118, clock gating logic 122, parallel interface engine block (PIE) 124, and serial interface engine block (SIE) 126.

Application specific logic 114 in one example comprises logic components (e.g., a control commands decoder, etc.) that execute the core functions of peripheral device 102.

Microprocessor 116 controls peripheral device 102 in the execution of its core function. Microprocessor 116 also controls the transfer of data within peripheral device 102 and the transmission and receipt of data from/to peripheral device 102.

Device backend 118 in one example comprises speed enumeration block 128. Peripheral device 102 employs speed enumeration block 128 to configure peripheral device 102 in an operational mode. For instance, if host device 106 supports the high speed operational mode, peripheral device 102 utilizes speed enumeration block 128 to configure peripheral device 102 to operate at 480 Mbps. Similarly, if host device 106 does not support the high speed operational mode, peripheral device 102 utilizes speed enumeration block 128 to configure peripheral device 102 to operate in either full speed operational mode or low speed operational mode. Peripheral device 102 also employs speed enumeration block 128 to disable and/or enable gated clock signals that drive parallel interface engine block 124 and serial interface engine block 126, as will be discussed herein.

Device backend 118 also comprises logic components that peripheral device 102 employs to execute and support backend functions. Examples of such logic components include, but are not limited to, endpoint configuration logic, system bus interface logic, direct memory access (DMA) logic, and the like.

Clock gating logic 122 comprises logic components to enable and/or disable gated clock signals that drive parallel interface engine block 124 and serial interface engine block 126. Clock gating logic 122 in one example generates the gated clock signals through employment of clock signal 123. In one example, clock signal 123 is generated by the same clock source that provides the clock signals that drive one or more components of peripheral device 102. Alternatively, clock signal 123 may be provided by a clock source independent of the other components of peripheral device 102. As another alternative, clock signal 123 may be a portion of a clock signal provided by another component of system 100, such as macrocell 104.

In one example, clock gating logic 122 disables a gated clock signal 125 that drives parallel interface engine block 124 when peripheral device 102 operates in either full speed 20 operational mode or low speed operational mode. In another example clock gating logic 122 disables a gated clock signal 127 that drives serial interface engine block 126 when peripheral operates in high speed operational mode, as will be discussed herein.

Alternatively, it should be recognized that if peripheral device 102 were to change from one operational mode to another, clock gating logic 122 would necessarily have to enable one gated clock signal just as it would have to disable the other gated clock signal. For instance if peripheral device 102 were changed from fill speed operational mode to high speed operational mode, clock gating logic 122 would disable gated clock signal 127 while enabling gated clock signal 125.

Parallel interface engine block 124 in one example comprises logic components that perform various functions while peripheral device 102 operates in high speed operational mode. Examples of functions that parallel interface engine block 124 performs are token packet identification, handshake packet identification, CRC5 checking for token packets, CRC 16 generation and checking for data packets, time out checking, assembly of DATA/HANDSHAKE packets, and transmitting DATA/HANDSHAKE packets. Parallel interface engine block 124 is configurable to receive either 8-bit or 16-bit parallel data streams. Parallel interface engine block 124 is driven by clock signal 125.

Serial interface engine block 126 in one example comprises logic components that perform various functions while peripheral device 102 operates in fall speed operational mode or low speed operational mode. Examples of functions that serial interface engine block 126 performs are NRZ decoding/encoding, bit stuffing/unstuffing, serial-to-parallel and parallel-to-serial conversion, token packet identification, data packet identification, handshake packet identification, CRC5 checking for token packets, CRC16 generation and checking for data packets, time out checking, assembling of DATA/HANDSHAKE packets and transmitting DATA/HANDSHAKE packets. Serial interface engine block 126 is driven by clock signal 127.

Clock signal 127 is provided to serial interface engine block 126 by clock gating logic 122.

Macrocell 104 in one example comprises a USB2 PHY macrocell of the kind manufactured by inSilicon Corporation of San Jose, Calif. In another example macrocell 104 comprises a Phillips PHY macrocell ISP1501. Other manufactures of macrocell 104 could also be used in system 100. Examples of functions that macrocell 104 performs are NRZ decoding/encoding, bit stuffing/unstuffing, serial-to-parallel and parallel-to-serial conversion, conversion of analog signals to digital levels and vice versa, and clock recovery when macrocell operates in high speed operational mode. In full speed or low speed operational mode, macrocell 104 generally performs conversion of analog signals to digital levels. Exemplary components of macrocell 104 comprise device logic/clocking block 134, USB 1.1 transceiver 136, and USB 2.0 transceiver 138.

Device logic/clocking block 134 in one example comprises logic components that perform various functions, such as sampling, data recovery, bit stuffing/unstuffing, and NRZI data coding/decoding on signals sent to/from peripheral 102.

USB 1.1 transceiver 136 in one example is operable to receive signals, through device logic/clocking block 134, from peripheral device 102, and to send signals to host device 106 when peripheral device 102 operates in low speed operation mode or full speed operational mode. USB 1.1 transceiver also is operable to receive signals from host device 106 and to send signals, through device logic/clocking block 134, to peripheral device 102 when peripheral device 102 operates in low speed or full speed operational mode.

USB 2.0 transceiver 138 in one example is operable to receive signals, through device logic/clocking block 134 from peripheral device 102 and to send data to host device 106 when peripheral device 102 operates in high speed operational mode. USB 2.0 transceiver is also operable to receive signals from host device 106 and to send signals, through device logic/clocking block 134, to peripheral device 102 when peripheral device 102 operates in high speed operational mode.

Host/hub device 106 in one example comprises a personal computer. Host/hub device 106 in another example comprises any computing device that is connectable to a USB 2.0 peripheral through a USB 2.0 bus. In another example, host/hub device 106 comprises a USB hub which expands the number of peripheral device that can be connected to a USB 2.0 bus.

Interface 108 connects peripheral device 102 and macrocell 104. Interface 108 in one example comprises a USB 2.0 transceiver macrocell interface (UTMI). A UTMI is operable as an 8-bit 60 MHz interface or as a 16-bit 30 MHz interface depending on the implementation of peripheral device 102.

Bus 110 in one example operates in accordance with the USB 2.0 standard. Accordingly, bus 110 in one example has three operational modes with three signaling rates. The three operational modes comprise the low speed operational mode having a signaling rate of 1.5 Mbps, the full speed operational mode having a 12 Mbps signaling rate, and the high speed operational mode having a 480 Mbps signaling rate.

Referring further to FIG. 1, system 100 operates such that peripheral device 102 and host device 106 exchange signals. In one example these signals comprise data, token, and/or handshake packets. In a further example, the signals are exchanged between peripheral device 102 and host/hub device 106 in accordance with the Universal Serial Bus (USB) 2.0 specification, the USB 2.0 UTMI Specification, and the Enhanced Host Controller Interface (EHCI) which are hereby incorporated by reference, and can be obtained from the USB Inventor's Forum, Inc. (USB-IF) of Portland, Oreg. Examples of signals that host device 106 sends to peripheral 102 are, for instance, a personal computer sending a print job to a printer, or sending a command to a scanner to begin a scan job. Another example is host device 106 sending a reset sequence signal, which resets the connection between host device 106 and peripheral device 102. In a further example, host device 106 may send a signal to peripheral device 102 that indicates an operational mode supported by host device 106.

Peripheral device 102 also sends signals to host device 106. For instance, a digital camera might send a picture file to host device 106. In another example, peripheral device 102 sends commands or control signals to host device 106. For instance, a printer might send an off-line signal to a host device 106. In another example, peripheral device 102 sends a chirp signal to host device 106 that indicates an operational mode supported by peripheral device 102. These examples are descriptive only and do not represent an exhaustive list of the transaction types that are possible between peripheral device 102 and host device 106, as would be understood by one of ordinary skill in the art.

An exemplary description of operation of system 100 is now provided.

Still referring to FIG. 1, in one example, host device 106 sends signals 140 over USB bus 110 to macrocell 104. USB 2.0 transceiver 138 receives signals 140 from host device 106 when peripheral device 102 operates in high speed operational mode. Similarly, USB 1.1 transceiver 136 receives signals 140 from host device 106 when peripheral device 102 operates in full speed operational mode or low speed operational mode.

In high speed operational mode, USB 2.0 transceiver 138 performs analog-to-digital conversion and/or clock recovery on signals 140. USB 2.0 transceiver 138 then sends signals 141 to device logic/clocking block 134.

In either the fill speed or low speed operational modes, USB 1.1 transceiver 136 performs analog-to-digital conversion and/or clock recovery on signals 140. USB 1.1 transceiver 136 then sends signals 142 to device logic/clocking block 134.

Device logic/clocking block 134 performs functions, such as HRI decoding, bit stuffing, deserialization, etc. on either signals 141 or signals 142, depending on the operational mode.

Device logic/clocking block 134 then outputs signals 143 to peripheral device 102 over interface 108. Signals 143 in one example comprise 8-bit 60 MHz interface or as a 16-bit 30 MHz signals.

When peripheral device 102 operates in high speed operational mode, signals 143 are received by parallel interface engine block 124. Simnilarly, when peripheral device 102 operates in low speed or full speed mode, signals 143 are received by serial interface engine block 126.

In high speed operational mode, parallel interface engine block 124 receives signals 143 and performs various operations (e.g., token packet identification, data packet identification, handshake packet identification, checking packet validity, etc.) on signals 143. Parallel interface engine block 124 then sends signals 145 to device backend 118.

In either low speed or full speed operational mode, serial interface engine block 126 receives signals 143 and performs various functions (e.g., NRZ decoding, deserialization, etc.) on signals 143. Serial interface engine block 126 then sends signals 146 to device backend 118.

Device backend 118 receives signals 145 or signals 146, checks the peripheral status, and generates a proper response, for instance data packet or handshake packet. Device backend 118 then sends signals 147 to microprocessor 116 and/or signals 148 to application specific logic 114.

After receipt of signals 147 and/or signals 148, microprocessor 116 and/or application specific logic 114 perform a particular function, such as printing data or performing a scan job. Microprocessor 116 and/or application specific logic 114 may also respond to signals 147, 148 by sending a response to host device 106. For example, if peripheral device 102 were a printer out of paper, the microprocessor 116 would send an out-of-paper message to host device 106. In another example, if peripheral device 102 were a malfunctioning scanner, microprocessor 116 would send a not-ready signal to host device 106.

When application specific logic 114 and/or microprocessor 116 send a response to host/hub device 106, signals 149 and/or signals 150 are sent to device backend 118. Examples of signals 149 and signal 150 comprise data, control signals, and/or command signals.

Device backend 114 performs functions, such as generation of new data or the cleaning of stale data, on signals 149, 150. Backend 114 then sends signals 151 to parallel interface engine block 124 when peripheral device 102 operates in high speed operational mode or signals 152 to serial interface engine block 126 when peripheral device 102 operates in either the low speed operational mode or the full speed operational mode.

In high speed operational mode, parallel interface engine block 124 receives signals 151, performs various functions such as assembling data into a packet format by appending a CRC16 block or assembling a handshake packet by picking the appropriate format, on signals 151 and sends signals 153 to macrocell 104.

In the fill speed or low speed operational modes, serial interface engine block 126 receives signals 152, performs functions such as assembling data into packet format by appending a CRC16 block or assembling a handshake packet by picking the appropriate handshake format and serializing on signals 152, and directs signals 153 over interface 108 to macrocell 104.

Device logic/clocking block 134 of macrocell 104 receives signals 153 and performs functions such as serialization, NRZI encoding, bit stuffing and the like on signals 147. Device logic/clocking block 134 then sends signals 154 to USB 2.0 transceiver 138 while peripheral device 102 operates in high speed operational mode or signals 155 to USB 1.1 transceiver 136 while peripheral device 102 operates in either low speed operational mode or fill speed operational mode. USB 1.1 transceiver 136 or USB 2.0 transceiver then sends signals 156 over USB bus 110 to host device 112, after performing functions such as analog-to-digital conversion, clock recovery, etc. In addition, USB 2.0 transceiver performs additional functions such as data deserialization, NRZ conversion and bit unstuffing, etc.

Host device 106 receives signals 156, and may, in one example, perform an operation in response to receipt of signals 149. Examples include but are not limited to sending a reset signal, sending a chirp signal, transmitting additional data to peripheral device 102, storing data in an internal or eternal hard disk, and/or notifying a user, via an output device, of an error condition.

Further referring to FIG. 1, in the above description of exemplary operation of system 100, peripheral device 102 operates in one of three operational modes. In each operational mode, one interface engine block is active and one interface engine block is inactive. For instance, in high speed operational mode, parallel interface engine block 124 is active and serial interface engine block 126 is inactive. Conversely, in full speed operational mode, serial interface engine block 126 is active and parallel interface engine block 124 is inactive.

When parallel interface engine block 124 is active, gated clock signal 125 drives parallel interface engine block 124 in the performance of its ftmctions. When parallel interface engine block 124 is inactive, gated clock signal 125 is not needed to drive parallel interface engine block 125. Therefore, peripheral device 102 conserves power by employing clock gating logic 122 to disable the clock signal, as will be described herein.

When serial interface engine block 126 is active, gated clock signal 127 drives serial interface engine block 126 in the performance of its functions. When serial interface engine block 126 is inactive, gated clock signal 127 is not needed to drive serial interface engine block 126. Therefore, peripheral device 102 conserves power by employing clock gating logic 122 to disable gated clock signal 127, as will be described herein.

Figure 2A:
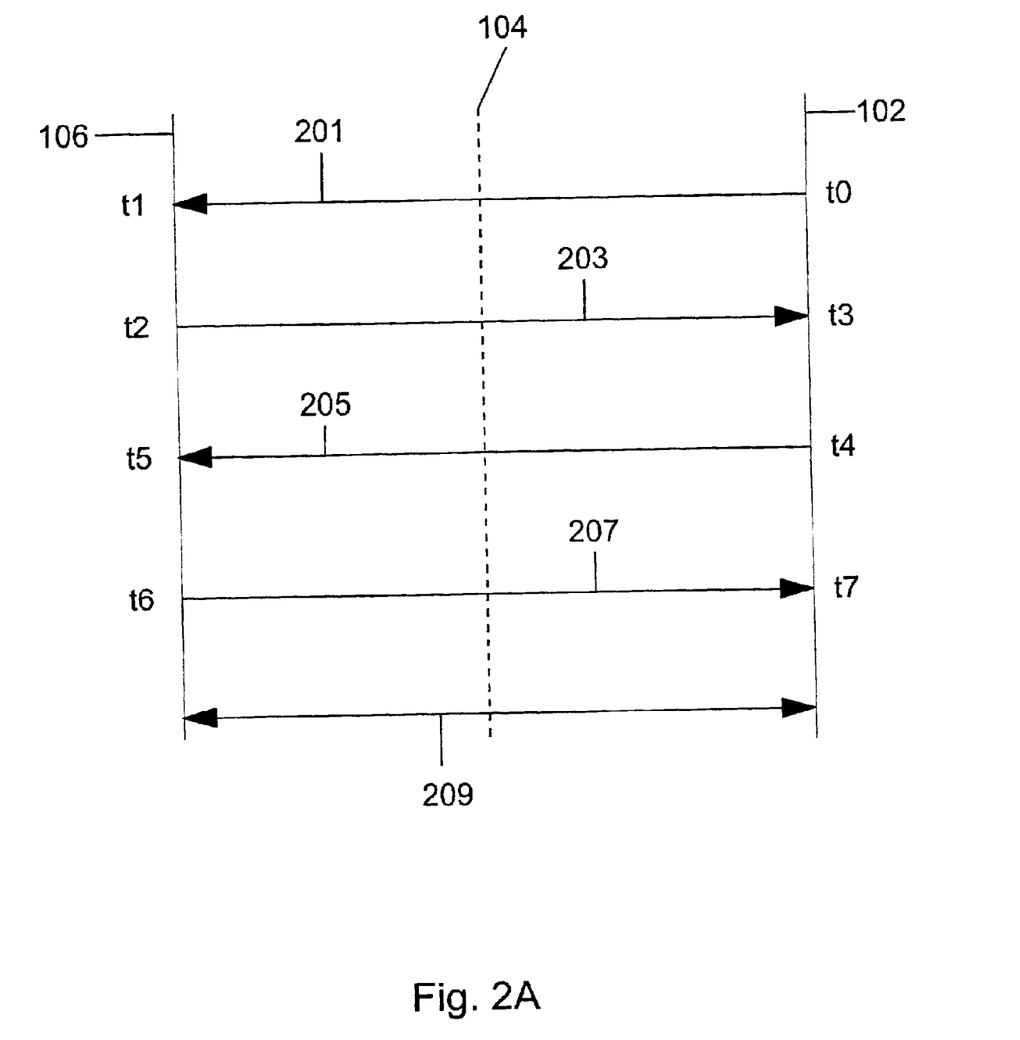
FIG. 2A is a timing diagram that illustrates an exemplary flow of signals between the peripheral device and the host device of FIG. 1.

FIG. 2A depicts an exemplary timing diagram for system 100 when host device 106 supports high speed operational mode.

In one example, at time t0, peripheral device 102 sends signal 201 to host/hub device 106 in accordance with the exemplary operation of system 100 described above. Signal 201, in one example, is sent by peripheral device 102 by pulling the pull-up resistor on Universal Serial Bus. For instance, in a high speed or full speed implementation the DPLS cable of a Universal Serial Bus is pulled high and for a low speed implementation, the DMNS cable of a Universal Serial Bus is pulled high. In one example, peripheral device 102 sends signal 201 to host/hub device 106 when peripheral device 102 is initially connected to host/hub device 106 through macrocell 104. In another example, peripheral device 102 sends signal 201 to host device 106 when peripheral device 102 and/or host/hub device 106 are powered-up. In a further example, peripheral device 102 sends signal 201 to host/hub device 106 in response to a user inputting a command at peripheral device 102.

At time t1, host/hub device 106 receives signal 201. In one example, hosthub device 106 begins a reset sequence in response to receipt of signal 201. In another example, host/hub device 106 might begin a reset sequence in response to an event other than host/hub device 106 receiving signal 201 from peripheral. For instance, a user of system 100 could manually start a reset sequence at host device 106 after configuring peripheral device 102 for a particular operational mode.

At time t2, as part of the reset sequence, host/hub device 106 sends signal 203 to peripheral device 102. Signal 203 indicates to peripheral device 102 that host device 106 has begun a reset sequence. In one example, host/hub device 106 accomplishes signal 203 by driving a single ended zero on bus 110.

At time t3, peripheral device 102 receives signal 203. Through receipt of signal 203, peripheral device detects that host device 106 has begun the reset sequence. At time t4, if peripheral device 102 is configured to operate in high speed operational mode, peripheral device 102 sends signal 205 to host device 106 in response to the detection that host/hub device 106 has begun a reset sequence. Signal 205 in one example comprises a chirp sequence that indicates to host device 106 that peripheral 102 is configured for operation in the high speed operational mode. A chirp sequence in one example is a K pattern (i.e., a Universal Serial Bus state of "01" is called a K pattern; similarly a "10" state is called a J pattern).

Host/hub device 106 receives signal 205 at time t5. Since, in the instant example, host device 106 supports the high speed operational mode, host/hub device 106 sends signal 207 to peripheral device 102 at time t6. In one example, signal 207 comprises a response chirp sequence that indicates to peripheral device 102 that host device 106 supports high speed operational mode. In one example, the response chirp sequence comprises a KJKJkJ pattern.

Peripheral device 102 receives signal 207 at time t7. Through receipt of signal 207, peripheral device 102 detects that host device 106 supports high speed operational mode. In response to a detection that host device 106 supports high speed operational mode, peripheral device 102 establishes a 480 Mbps connection 209 between peripheral device 102 and host/hub device 106.

It should be noted that as an alternative, peripheral device 102 could be configured as full speed only or low speed only. In such a case, peripheral device 102 would not send signal 205. Instead, peripheral device 102 would simply establish a full speed or low speed connection with host/hub device 106.

Figure 2B:
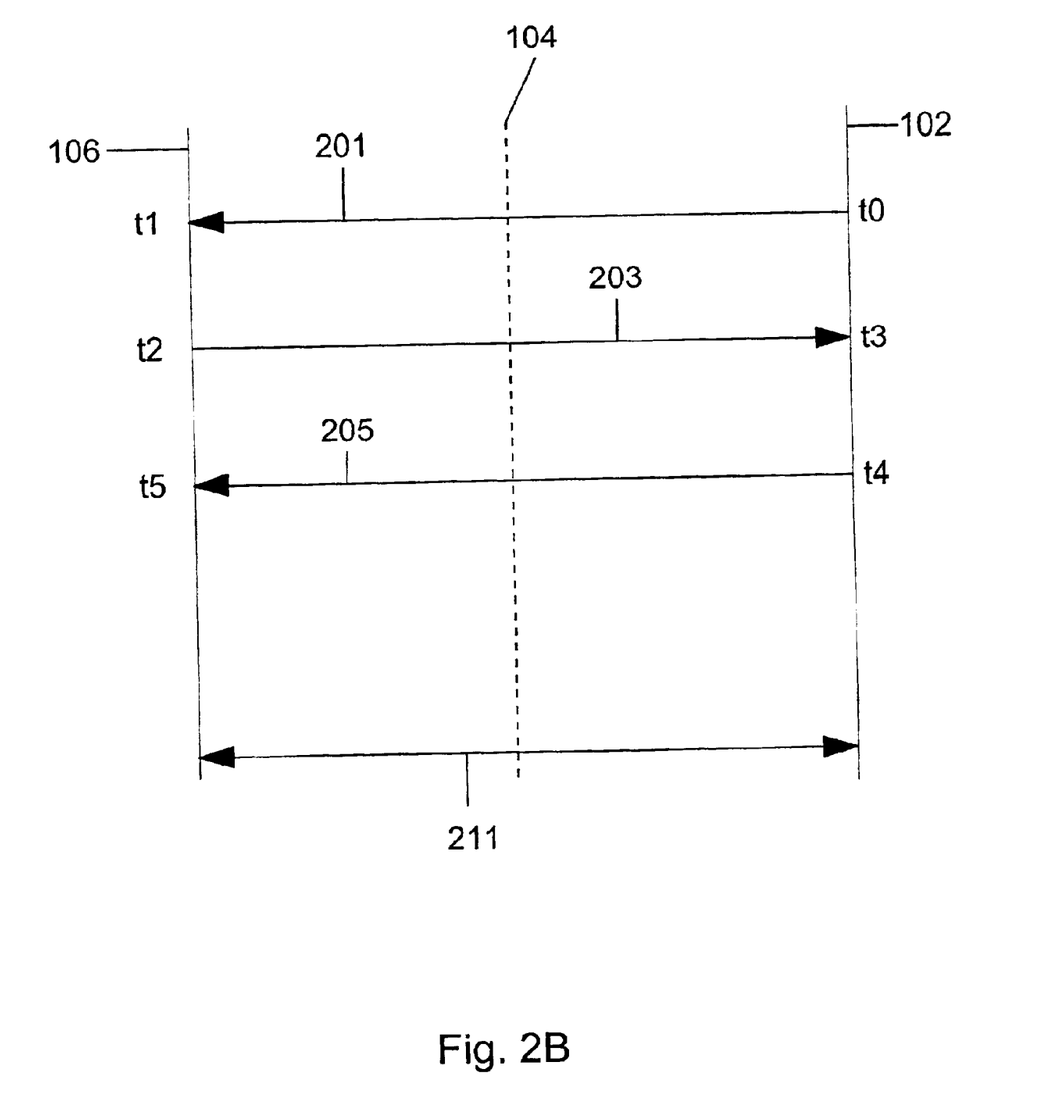
FIG. 2B is a timing diagram that illustrates an exemplary flow of signals between the peripheral device and the host device of FIG. 1.

FIG. 2B depicts an exemplary timing diagram for system 100 when host device 106 does not support high speed operational mode.

In one example, at time to, peripheral device 102 sends signal 201 to host device 106. As was stated above, signal 201, in one example, is sent by pulling the DPLS capable of a Universal Serial Bus high for a high speed or full speed implementation of peripheral device 102 or is sent by pulling the DMNS cable of a Universal Serial Bus high for a low speed implementation. In one example, peripheral device 102 sends signal 201 to host device 106 when peripheral device 102 is initially connected to host device 106 through macrocell 104. In another example, peripheral device 102 sends signal 201 to host device 106 when peripheral device 102 and/or host device 106 are powered-up. In a further example, peripheral device 102 sends signal 201 to host device 106 in response to a user inputting a command at peripheral device 102.

At time t1, host device 106 receives signal 201. In one example, host device 106 begins a reset sequence in response to receipt of signal 201. In another example, host device 106 might begin a reset sequence in response to an event other than host device 106 receiving signal 201 from peripheral. For instance, a user of system 100 could manually start a reset sequence at host device 106 after configuring peripheral device 102 for a particular operational mode.

At time t2, as part of the reset sequence, host device 106 sends signal 203 to peripheral device 102. Signal 203 indicates to peripheral device 102 that host device 106 has begun a reset sequence. Signal 203 in one example comprises a single ended zero driven by host/hub device 106 on bus 110.

At time t3, peripheral device 102 receives signal 203. Through receipt of signal 203, peripheral device 102 detects that host device 106 has begun the reset sequence. At time t4, if peripheral device 102 is configured to operate in high speed operational mode, peripheral device 102 sends message 205 to host device 106 in response to the detection that host device 106 has begun a reset sequence. Signal 205 in one example comprises a chirp sequence that indicates to host device 106 that peripheral 102 is configured for operation in the high speed operational mode. The chirp sequence from peripheral device 102 to host/hub device 106 in one example comprises a K pattern.

Host device 106 receives signal 205 at time t5. In the instant example, host device 106 does not support the high speed operational mode. Hence, unlike FIG. 2A, host device 106 does not send a response chirp sequence that indicates to peripheral device 102 that host device 106 supports high speed operational mode. If peripheral device 102 does not receive a signal indicating that host device 106 supports high speed operational mode within a prescribed time period, speed enumeration block 128 establishes connection 211 between peripheral device 102 and host device 106. Connection 211 in one example comprises either a low speed 1.5 Mbps connection or a full speed 12 Mbps connection, depending on the implementation of peripheral device 102.

Referring now to FIGS. 2A and 2B in one example signals 201, 203, 205 and 207 pass through macrocell 104, as described above with respect to FIG. 1. Moreover, system 100 can be implemented to employ either USB 1.1 transceiver 136 or USB 2.0 transceiver 138 to send/receive signals 201, 203, 205, and 207 to/from host device 106.

Figure 3:
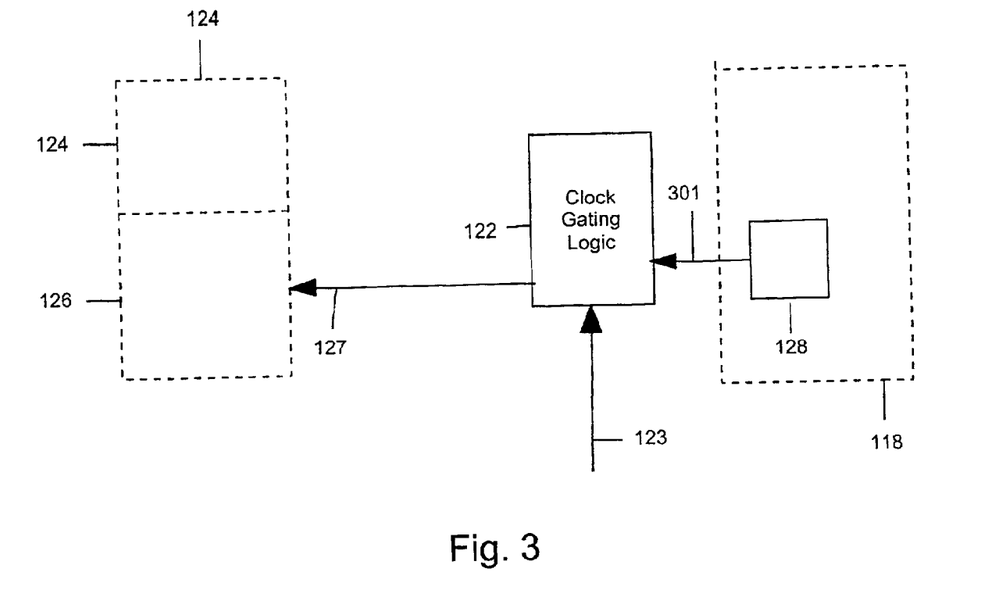
FIG. 3 is an exemplary block diagram of a portion of the peripheral device of FIG. 1 that illustrates the disabling of a clock signal to a serial interface engine block for a selected operational mode.

Referring now to FIGS. 2A and 3, in conjunction with a high speed connection 209 being established between peripheral device 102 and host device 106, speed enumeration block 128 sends signal 301 to clock gating logic 122. Signal 301 in one example comprises a signal that causes clock gating logic 122 to disable the gated clock signal 127 to serial interface engine block 126. In response to receipt of signal 301 gated clock signal 127 is disabled and stops driving serial interface engine block 126.

Figure 4:
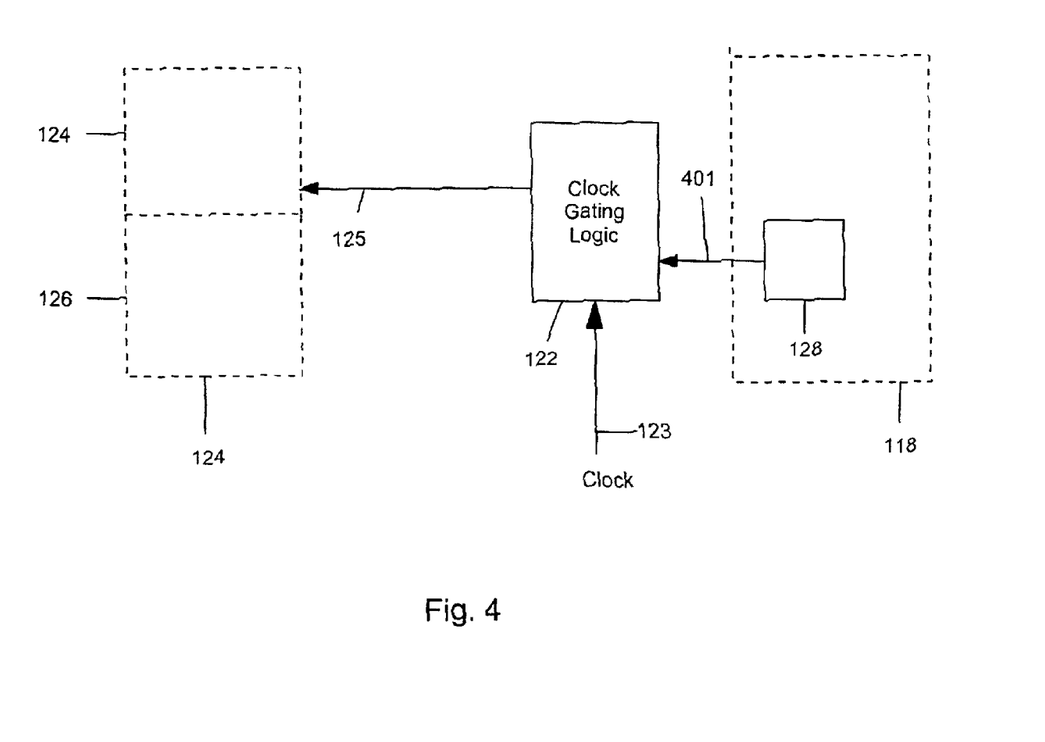
FIG. 4 is an exemplary block diagram of a portion of the peripheral device of FIG. 1 that illustrates the disabling of a clock signal to a parallel interface engine block for a selected operational mode.

Referring to FIGS. 2B and 4, when either a low speed connection or a full speed connection is established between peripheral device 102 and host device 106, speed enumeration block 128 sends signal 401 to clock gating logic 122. Signal 401 in one example comprises a signal that causes clock gating logic 122 to disable gated clock signal 125 to parallel interface engine block 124. Clock gating logic 122 in one example responds to receipt of signal 401 by stopping transmission of gated clock signal 125 that drives parallel interface engine block 124.

Referring to FIGS. 3 and 4, as an alternative, it should be noted that clock gating logic 122 could employ signals 301 and 401 to enable rather than disable gated clock signal 127 or gated clock signal 125. For instance, gated clock signal 127 or gated clock signal 125 could have a default "off" condition. Hence, if either a full speed connection or a low speed connection were established between peripheral device 102 and host device 106, clock gating logic 122 could enable gated clock signal 127. Likewise, if a high speed connection were established between peripheral device 102 and host device 106, clock gating logic 122 could enable clock signal 125. Similarly, as was stated above, if peripheral device 102 were to switch from one operational mode to another, it might be necessary to enable gated clock signal 125 while disabling the other gated clock signal 127, and vice versa.

Figure 5:
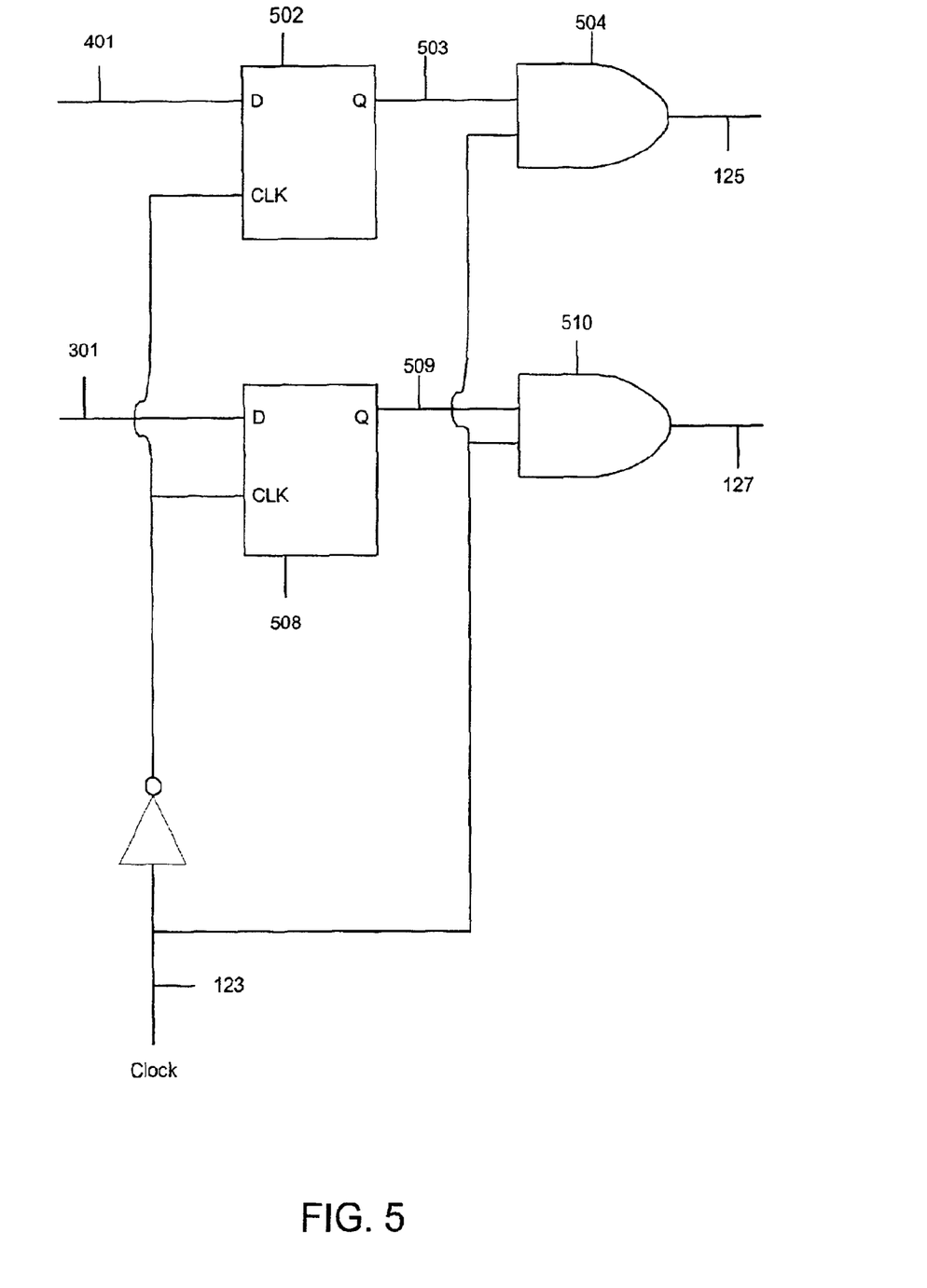
FIG. 5 is a block diagram of exemplary clock gating logic employable in the peripheral device of FIG. 1.

Referring to FIG. 5, a description of exemplary clock gating logic 500 that is employable in system 100 is now provided. In one example clock gating logic 122 is implemented through the employment of a D flip flops 502, 508 coupled to AND gates 504, 510, respectively. In one example, D flip flop 502 and AND gate 504 are employed to generate gated clock signal 125 for parallel interface engine block 124. Similarly, D flip flop 508 and AND gate 510 are employed to generated gated clock signal 127 for serial interface engine block 126.

In the implementation, each D flip flop 502, 508 receives clock signal 123 as a clock input. D flip flop 502 receives enable signal 401 as a D input. D flip flop 508 receives signal 301 as a D input. The output of AND gate 504 is gated clock signal 125, and the output of AND gate 510 is gated clock signal 127. Each flip flop output 503, 509 is AND gated with clock signal 123 and whenever clock enable signal 301, 401 is active for a particularly flip flop, the corresponding gated clock signal 127, 125 will be the same as the clock signal 123. Similarly, when a clock enable signal 301, 401 is not active, the corresponding gated clock signal 127,125 will not be active and will be held at value LOW. Accordingly, to disable gated clock signal 127, clock enable signal 301 must be driven low by speed enumeration block 128, and to disable gated clock signal 125, clock enable signal 401 must be driven low by speed enumeration block 128.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method for operating a peripheral device having at least two operational modes, the method comprising:
   selecting a first one of the at least two operational modes for the peripheral device;
   supplying a first clock signal to a first interface engine block associated with the first one of the at least two operational modes; and
   disabling a second clock signal to a second interface engine block associated with a second one of the at least two operational modes.

2. The method of claim 1, wherein selecting the first one of the at least two operational modes comprises:
   sending a first signal to a host device that indicates that the peripheral device is operable in the first one of the at least two operational modes; and
   receiving a second signal from the host device that indicates that the host device supports the first one of the at least two operational modes.

3. The method of claim 1, wherein the peripheral device comprises a USB 2.0 device, and
   wherein the at least two operational modes comprise a low speed operational mode, a full speed operational mode, and a high speed operational mode.

4. The method of claim 3, wherein the first one of the at least two operational modes comprises the high speed operational mode,
   wherein the first interface engine block comprises a parallel interface engine block, and
   wherein
      the second interface engine block comprises a serial interface engine block.

5. The method of claim 4, wherein the first one of the at least two operational modes comprises one of the low speed operational mode and the full speed operational mode,
   wherein the first interface engine block comprises a serial interface engine block, and
   wherein the second interface engine block comprises a parallel interface engine block.

6. The method of claim 1, wherein selecting the first one of the at least two operational modes comprises:

sending a first signal to a host device that indicates that the peripheral device is operable in a second one of the at least two operational modes; and selecting the first one of the at least two operational modes after non-receipt, within a prescribed time period, of a second signal from the host device that indicates that the host device supports the second one of the at least two operational modes.

7. A system comprising:

a first interface engine block;

a second interface engine block;

a speed enumeration block for selecting one of a first operational mode and a second operational mode for the system; and clock gating logic for providing a first clock signal to the first interface engine block and disabling a second clock signal for the second interface engine block during the first operational mode, and for disabling the first clock signal for the first interface engine block and providing the second clock signal to the second interface engine block during the second operational mode.

8. The system of claim 7, wherein the speed enumeration block comprises:

a first logic component for sending a first signal to a host device, the first signal indicating that the system is operable in one of the first operational mode and the second operational mode; and a second logic component for receiving a second signal from the host device, the second signal indicating that the host device supports the one of the first operational mode and the second operational mode for the system.

9. The system of claim 7, wherein the system comprises a USB 2.0 peripheral, and wherein the first interface engine block and the second interface engine block comprise a serial interface engine block and a parallel interface engine block, respectively.

10. The system of claim 9, wherein the first operational mode comprises one of a low speed operational mode and a full speed operational mode, and wherein the second operational mode comprises a high speed operational mode.

11. The system of claim 7, wherein the speed enumeration block comprises:

a first logic component for sending a first signal to a host device, the first signal identifying the system as being functional in a first one of the first operational mode and the second operational mode; and a second logic component for selecting a second one of the first operational mode and the second operational mode after non-receipt, within a prescribed time period, of a second signal from the host device, the second signal indicating support by the host device for the first one of the first operational mode and the second operational mode.

12. A device for controlling clock signals to a serial interface engine block (SIE) and a parallel interface engine block (PIE) in a USB 2.0 peripheral, the device comprising:

clock gating logic for providing a first clock signal to the SIE and disabling a second clock signal to the PIE when the USB 2.0 peripheral operates in one of a low speed operational mode and a full speed operational mode, and for disabling the first clock signal to the SIE and providing the second clock signal to the PIE when the USB 2.0 peripheral operates in a high speed operational mode.

* * * * *